United States Patent
Jones et al.

(10) Patent No.: US 6,308,138 B1
(45) Date of Patent: Oct. 23, 2001

(54) DIAGNOSTIC RULE BASE TOOL CONDITION MONITORING SYSTEM

(75) Inventors: Joel W. Jones, Windsor (CA); Ya Wu, Wuhan (CN)

(73) Assignee: Tri-Way Machine Ltd., Windsor (CA)

( * ) Notice: Subject to any disclaimer, the term of this patent is extended or adjusted under 35 U.S.C. 154(b) by 0 days.

(21) Appl. No.: 08/901,609

(22) Filed: Jul. 28, 1997

(51) Int. Cl.⁷ .................................................... G06F 19/00
(52) U.S. Cl. .............................. 702/34; 702/60; 700/174; 700/175
(58) Field of Search .......................... 702/34, 35, 42–44, 702/57, 60, 61, 71, 64–66, 79, 81, 82, 176–178, 179, 182–185, 189, 193, FOR 135–FOR 137, FOR 170, FOR 171, FOR 103, FOR 104, FOR 106; 364/140.04, 140.09, 184, 185, 468.15, 486.16, 468.17, 474.01, 474.02, 474.15–474.17, 474.19, 474.2, 474.22, 474.34, 474.35, 528.1, 528.21, 528.3, 528.26–528.29, 528.31; 340/680, 683; 73/593, 104, 660; 318/565–567; 388/909; 408/11, 6, 8, 16; 409/134, 193, 194; 706/904, 912; 700/174, 175; 451/5, 8, 21

(56) References Cited

U.S. PATENT DOCUMENTS

| | | | |
|---|---|---|---|
| 3,694,637 | 9/1972 | Edwin et al. | 702/34 |
| 4,351,029 | 9/1982 | Maxey et al. | 702/34 |
| 4,471,444 | 9/1984 | Yee et al. | 364/474.17 |
| 4,658,245 | * 4/1987 | Dye et al. | 364/474.17 |
| 4,748,554 | 5/1988 | Gebauer et al. | 364/474.17 |
| 5,070,655 | * 12/1991 | Aggarwal | 700/175 |
| 5,210,704 | * 5/1993 | Husseiny | 702/34 |
| 5,247,452 | 9/1993 | Ueda et al. | 364/474.17 |
| 5,251,144 | * 10/1993 | Ramamurthi | 706/904 |
| 5,407,265 | 4/1995 | Hamidieh et al. | 340/680 |
| 5,566,092 | * 10/1996 | Wang et al. | 706/904 |
| 5,587,931 | 12/1996 | Jones et al. | 702/34 |
| 5,857,166 | * 1/1999 | Kim | 700/175 |
| 5,921,726 | * 7/1999 | Shiozaki et al. | 700/175 |

OTHER PUBLICATIONS

Feature Extraction and Assessment Using Wavelet Packets for Monitoring of MachIning Processes by Dr. Ya Wu and R. Du, (No Date).

\* cited by examiner

*Primary Examiner*—Hal Wachsman
(74) *Attorney, Agent, or Firm*—Reising, Ethington, Barnes, Kisselle, Learman & McCulloch, P.C.

(57) ABSTRACT

A tool condition monitoring system monitors the power consumption of a tool during performance of a cyclical task. The system monitors a plurality of characteristics of the power consumption and diagnoses the condition of the tool based upon the plurality of characteristics. A rule base of the plurality of characteristics is generated in a learning mode by monitoring a tool of known condition for a plurality of cycles. In monitor mode, the system monitors the power consumption of a tool and diagnosis the condition of the tool by indexing the rule base based upon the plurality of characteristics monitored.

17 Claims, 22 Drawing Sheets

RULES OF CUTTING PROCESS MONITORING

| No. | CODE | | | EXAMPLE OF SIGNAL BEHAVIOUR | TYPICAL FEATURES OF SIGNAL | POSSIBLE REASONS | ALARM LIGHT | STOP? |
|---|---|---|---|---|---|---|---|---|
| | _cr | _cc | _ma | | | | | |
| 1 | 0 | 0 | 0 | 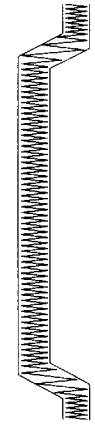 | • SMALL AMPLITUDE<br>• STABLE PROCESS<br>• NO INSTANTANEOUS FAST CHANGE(S) | NORMAL | GREEN | |
| 2 | 0 | 0 | 1 | 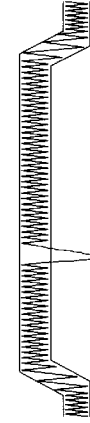 | • INSTANTANEOUS FAST DOWNWARD (UNDERLOAD) CHANGE(S) | • TOOL LOOSEN OR DROPPING<br>• WORKPIECE LOOSEN OR MOVING | RED | ✓ |
| 3 | 0 | 0 | 2 | 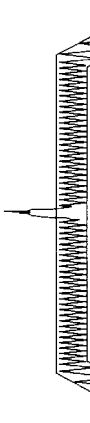 | • INSTANTANEOUS FAST UPWARD (OVERLOAD) CHANGE(S) | • COLLISION IN SOMEWHERE<br>• TOOL CHIP OR BREAKAGE<br>• HARD SPOT(S) IN MATERIAL | RED | ✓ |
| 4 | 0 | 0 | 3 | 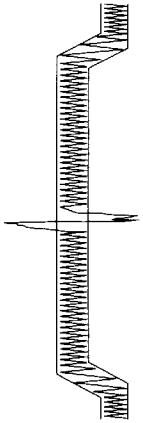 | • INSTANTANEOUS FAST DOWNWARD (UNDERLOAD) AND UPWARD (OVERLOAD) CHANGE(S) | • COLLISION OR IMPACT IN SOMEWHERE<br>• TOOL CHIP OR BREAKAGE<br>• TOOL LOOSEN OR DROPPING<br>• WORKPIECE LOOSEN OR MOVING<br>• NONSMOOTH FEEDING/MOVING | RED | ✓ |

Fig-7

| | | | | | | |
|---|---|---|---|---|---|---|
| 5 | 0 | 1 | 0 | ![graph] | • DOWNWARD (UNDERLOAD) UNSTABLE<br>• NO INSTANTANEOUS FAST CHANGE(S) | • TOOL LOOSEN OR DROPPING<br>• WORKPIECE LOOSEN OR MOVING<br>• POROUS OR SOFT LAYER(S) IN MATERIAL<br>• TOOL MISSING OR TOOL(S) MISSING MATERIAL<br>• WRONG SIZE (SMALLER) TOOL(S)<br>• BRAND NEW TOOL(S) OR FRESH CUTTING EDGE(S)<br>• UNDERLOAD FOR ANY REASON | YELLOW |
| 6 | 0 | 1 | 1 | ![graph] | • INSTANTANEOUS FAST DOWNWARD (UNDERLOAD) CHANGE(S)<br>• DOWNWARD (UNDERLOAD) UNSTABLE | • TOOL LOOSEN OR DROPPING<br>• WORKPIECE LOOSEN OR MOVING<br>• POROUS OR SOFT LAYER(S) IN MATERIAL<br>• TOOL MISSING OR TOOL(S) MISSING MATERIAL<br>• WRONG SIZE (SMALLER) TOOL(S)<br>• BRAND NEW TOOL(S) OR FRESH CUTTING EDGE(S)<br>• UNDERLOAD FOR ANY REASON | RED ✓ |
| 7 | 0 | 1 | 2 | ![graph] | • INSTANTANEOUS FAST UPWARD (OVERLOAD) CHANGE(S)<br>• DOWNWARD (UNDERLOAD) UNSTABLE | • COLLISION IN SOMEWHERE<br>• TOOL CHIP OR BREAKAGE<br>• HARD SPOT(S) IN MATERIAL<br>• TOOL LOOSEN OR DROPPING<br>• WORKPIECE LOOSEN OR MOVING<br>• TOOL MISSING OR TOOL(S) MISSING MATERIAL<br>• WRONG SIZE (SMALLER) TOOL(S)<br>• BRAND NEW TOOL(S) OR FRESH CUTTING EDGE(S) | RED ✓ |
| 8 | 0 | 1 | 3 | ![graph] | • INSTANTANEOUS FAST DOWNWARD (UNDERLOAD) AND UPWARD (OVERLOAD) CHANGE(S)<br>• DOWNWARD (UNDERLOAD) UNSTABLE | • COLLISION OR IMPACT IN SOMEWHERE<br>• TOOL CHIP OR BREAKAGE<br>• TOOL LOOSEN OR DROPPING<br>• WORKPIECE LOOSEN OR MOVING<br>• TOOL MISSING OR TOOL(S) MISSING MATERIAL<br>• WRONG SIZE (SMALLER) TOOL(S)<br>• BRAND NEW TOOL(S) OR FRESH CUTTING EDGE(S) | RED ✓ |

*Fig-8*

| # | | | Waveform | Characteristics | Level | ✓ |
|---|---|---|---|---|---|---|
| 9 | 0 | 2 | 0 | | • UPWARD (OVERLOAD) UNSTABLE<br>• NO INSTANTANEOUS FAST CHANGE(S) | • TOOL WEAR WORSE/DULL<br>• PART OF TOOLS WEAR WORSE/DULL<br>• WORKPIECE LOOSEN OR MOVING<br>• HARD LAYER(S) IN MATERIAL<br>• WRONG SIZE (BIGGER) TOOL(S)<br>• OVERLOAD FOR ANY REASON | YELLOW | |
| 10 | 0 | 2 | 1 | | • INSTANTANEOUS FAST DOWNWARD (UNDERLOAD) CHANGE(S)<br>• UPWARD (OVERLOAD) UNSTABLE | • TOOL WEAR WORSE/DULL<br>• WORKPIECE LOOSEN OR MOVING<br>• TOOL LOOSEN OR DROPPING<br>• HARD SPOT(S) IN MATERIAL<br>• WRONG SIZE (BIGGER) TOOL(S)<br>• OVERLOAD FOR ANY REASON | RED | ✓ |
| 11 | 0 | 2 | 2 | | • INSTANTANEOUS FAST UPWARD (OVERLOAD) CHANGE(S)<br>• UPWARD (OVERLOAD) UNSTABLE | • COLLISION IN SOMEWHERE<br>• TOOL CHIP OR BREAKAGE<br>• HARD SPOT(S) IN MATERIAL<br>• TOOL(S) WEAR WORSE/DULL<br>• WORKPIECE LOOSEN OR MOVING<br>• HARD LAYER(S) IN MATERIAL<br>• WRONG SIZE (BIGGER) TOOL(S)<br>• OVERLOAD FOR ANY REASON | RED | ✓ |
| 12 | 0 | 2 | 3 | | • INSTANTANEOUS FAST DOWNWARD (UNDERLOAD) AND UPWARD (OVERLOAD) CHANGE(S)<br>• UPWARD (OVERLOAD) UNSTABLE | • COLLISION OR IMPACT IN SOMEWHERE<br>• TOOL CHIP OR BREAKAGE<br>• TOOL(S) WEAR WORSE/DULL<br>• WORKPIECE LOOSEN OR MOVING<br>• TOOL LOOSEN OR DROPPING<br>• HARD LAYER(S) IN MATERIAL<br>• WRONG SIZE (BIGGER) TOOL(S)<br>• OVERLOAD FOR ANY REASON | RED | ✓ |
| 13 | 0 | 3 | 0 | | • DOWNWARD (UNDERLOAD) AND UPWARD (OVERLOAD) UNSTABLE<br>• NO INSTANTANEOUS FAST CHANGE(S) | • TOOL WEAR WORSE/DULL<br>• IN-HOMOGENEOUS MATERIAL<br>• ABNORMAL CUTTING CYCLE<br>• TOOL LOOSEN OR DROPPING<br>• WORKPIECE LOOSEN OR MOVING | YELLOW | |

Fig-9

| | | | | | | |
|---|---|---|---|---|---|---|
| 14 | 0 | 3 | 1 | ![waveform] | • INSTANTANEOUS FAST DOWNWARD (UNDERLOAD) CHANGE(S)<br>• DOWNWARD (UNDERLOAD) AND UPWARD (OVERLOAD) UNSTABLE | • TOOL WEAR WORSE/DULL<br>• TOOL LOOSEN OR DROPPING<br>• WORKPIECE LOOSEN OR MOVING<br>• TOOL MISSING OR TOOL(S) MISSING MATERIAL<br>• UN-HOMOGENEOUS MATERIAL<br>• ABNORMAL CUTTING CYCLE | RED ✓ |
| 15 | 0 | 3 | 2 | ![waveform] | • INSTANTANEOUS FAST UPWARD (OVERLOAD) CHANGE(S)<br>• DOWNWARD (UNDERLOAD) AND UPWARD (OVERLOAD) UNSTABLE | • COLLISION IN SOMEWHERE<br>• TOOL CHIP OR BREAKAGE<br>• TOOL WEAR WORSE/DULL<br>• TOOL LOOSEN OR DROPPING<br>• WORKPIECE LOOSEN OR MOVING<br>• HARD LAYER(S) IN MATERIAL<br>• UN-HOMOGENEOUS MATERIAL<br>• ABNORMAL CUTTING CYCLE | RED ✓ |
| 16 | 0 | 3 | 3 | ![waveform] | • INSTANTANEOUS FAST DOWNWARD (UNDERLOAD) AND UPWARD (OVERLOAD) CHANGE(S)<br>• DOWNWARD (UNDERLOAD) AND UPWARD (OVERLOAD) UNSTABLE | • COLLISION OR IMPACT IN SOMEWHERE<br>• TOOL CHIP OR BREAKAGE<br>• TOOL WEAR WORSE/DULL<br>• TOOL LOOSEN OR DROPPING<br>• WORKPIECE LOOSEN OR MOVING<br>• UN-HOMOGENEOUS MATERIAL<br>• ABNORMAL CUTTING CYCLE | RED ✓ |
| 17 | 1 | 0 | 0 | ![waveform] | • LEVEL DOWNWARD (UNDERLOAD)<br>• STABLE PROCESS<br>• NO INSTANTANEOUS FAST CHANGE(S) | • A LITTLE UNDERLOAD<br>• BRAND NEW TOOL(S) OR FRESH CUTTING EDGE(S)<br>• WRONG SIZE (SMALLER) TOOL(S)<br>• TOOL MISSING OR TOOL MISSING MATERIAL<br>• SOFT MATERIAL<br>• TOOL LOOSEN OR DROPPING<br>• WORKPIECE LOOSEN OR MOVING | YELLOW |

*Fig-10*

| | | | | | | |
|---|---|---|---|---|---|---|
| 18 | 1 | 0 | 1 | ⎍⎍⎍⎍⎍⎍⎍⎍⏷⎍⎍⎍⎍⎍⎍ | • INSTANTANEOUS FAST DOWNWARD (UNDERLOAD) CHANGE(S)<br>• LEVEL DOWNWARD (UNDERLOAD) | • BRAND NEW TOOL(S) OR FRESH CUTTING EDGE(S)<br>• TOOL MISSING OR TOOL MISSING MATERIAL<br>• TOOL LOOSEN OR DROPPING<br>• WORKPIECE LOOSEN OR MOVING<br>• WRONG SIZE (SMALLER) TOOL(S)<br>• SOFT MATERIAL | RED ✓ |
| 19 | 1 | 0 | 2 | ⎍⎍⎍⎍⎍⎍⎍⎍⏶⎍⎍⎍⎍⎍⎍ | • INSTANTANEOUS FAST UPWARD (OVERLOAD) CHANGE(S)<br>• LEVEL DOWNWARD (UNDERLOAD) | • COLLISION IN SOMEWHERE<br>• TOOL CHIP OR BREAKAGE<br>• BRAND NEW TOOL(S) OR FRESH CUTTING EDGE(S)<br>• TOOL MISSING OR TOOL MISSING MATERIAL<br>• TOOL LOOSEN OR DROPPING<br>• WORKPIECE LOOSEN OR MOVING<br>• HARD SPOT(S) IN MATERIAL<br>• WRONG SIZE (SMALLER) TOOL(S) | RED ✓ |
| 20 | 1 | 0 | 3 | ⎍⎍⎍⎍⎍⎍⎍⏷⏶⎍⎍⎍⎍⎍⎍ | • INSTANTANEOUS FAST DOWNWARD (UNDERLOAD) AND UPWARD (OVERLOAD) CHANGE(S)<br>• LEVEL DOWNWARD (UNDERLOAD) | • COLLISION OR IMPACT IN SOMEWHERE<br>• TOOL CHIP OR BREAKAGE<br>• BRAND NEW TOOL(S) OR FRESH CUTTING EDGE(S)<br>• TOOL MISSING OR TOOL MISSING MATERIAL<br>• TOOL LOOSEN OR DROPPING<br>• WORKPIECE LOOSEN OR MOVING<br>• UNDERLOAD FOR ANY REASON<br>• WRONG SIZE TOOL(S) | RED ✓ |
| 21 | 1 | 1 | 0 | ⎍⎍⎍⎍⎍⎍⎍⎍⎍⎍⎍⎍⎍⎍⎍ | • LEVEL DOWNWARD (UNDERLOAD)<br>• DOWNWARD (UNDERLOAD) UNSTABLE<br>• NO INSTANTANEOUS FAST CHANGE(S) | • TYPICAL UNDERLOAD<br>• BRAND NEW TOOL(S) OR FRESH CUTTING EDGE(S)<br>• WRONG SIZE (SMALLER) TOOL(S)<br>• TOOL MISSING OR TOOL MISSING MATERIAL<br>• TOOL LOOSEN OR DROPPING<br>• WORKPIECE LOOSEN OR MOVING<br>• POROUS OR SOFT LAYER(S) IN MATERIAL | YELLOW |

*Fig-11*

| 22 | 1 | 1 | [waveform] | • LEVEL DOWNWARD (UNDERLOAD)<br>• DOWNWARD (UNDERLOAD) UNSTABLE<br>• INSTANTANEOUS FAST DOWNWARD (UNDERLOAD) CHANGE(S) | • TYPICAL UNDERLOAD<br>• TOOL LOOSEN OR DROPPING<br>• WORKPIECE LOOSEN OR MOVING<br>• TOOL MISSING OR TOOL MISSING MATERIAL<br>• BRAND NEW TOOL(S) OR FRESH CUTTING EDGE(S)<br>• WRONG SIZE (SMALLER) TOOL(S)<br>• ABNORMAL CUTTING CYCLE<br>• POROUS OR SOFT LAYER(S) IN MATERIAL | RED | ✓ |
|---|---|---|---|---|---|---|---|
| 23 | 1 | 1 | [waveform] | • LEVEL DOWNWARD (UNDERLOAD)<br>• DOWNWARD (UNDERLOAD) UNSTABLE<br>• INSTANTANEOUS FAST UPWARD (OVERLOAD) CHANGE(S) | • COLLISION IN SOMEWHERE<br>• TOOL CHIP OR BREAKAGE<br>• HARD SPOT(S) IN MATERIAL<br>• TOOL LOOSEN OR DROPPING<br>• WORKPIECE LOOSEN OR MOVING<br>• TOOL MISSING OR TOOL MISSING MATERIAL<br>• BRAND NEW TOOL(S) OR FRESH CUTTING EDGE(S)<br>• WRONG TOOL(S)<br>• UN-HOMOGENEOUS MATERIAL | RED | ✓ |
| 24 | 1 | 1 | [waveform] | • LEVEL DOWNWARD (UNDERLOAD)<br>• DOWNWARD (UNDERLOAD) UNSTABLE<br>• NO INSTANTANEOUS FAST DOWNWARD (UNDERLOAD) AND UPWARD (OVERLOAD) CHANGE(S) | • COLLISION OR IMPACT IN SOMEWHERE<br>• TOOL CHIP OR BREAKAGE<br>• TOOL LOOSEN OR DROPPING<br>• WORKPIECE LOOSEN OR MOVING<br>• TOOL MISSING OR TOOL MISSING MATERIAL<br>• BRAND NEW TOOL(S) OR FRESH CUTTING EDGE(S)<br>• WRONG TOOL(S)<br>• UN-HOMOGENEOUS MATERIAL | RED | ✓ |

*Fig-12*

| | | | | | | | |
|---|---|---|---|---|---|---|---|
| 25 | 1 | 2 | 0 | [waveform] | • LEVEL DOWNWARD (UNDERLOAD)<br>• UPWARD (OVERLOAD) UNSTABLE<br>• NO INSTANTANEOUS FAST CHANGE(S) | • UNSTABLE PROCESSS<br>• TOOL(S) IS BECOMING DULL OR PART OF TOOL(S) IS WORN<br>• BRAND NEW TOOL(S) OR FRESH CUTTING EDGE(S)<br>• TOOL MISSING OR TOOL MISSING MATERIAL<br>• TOOL LOOSEN OR DROPPING<br>• WORKPIECE LOOSEN OR MOVING<br>• HARD LAYER(S) IN MATERIAL<br>• WRONG SIZE TOOL(S) | YELLOW |
| 26 | 1 | 2 | 1 | [waveform] | • LEVEL DOWNWARD (UNDERLOAD)<br>• UPWARD (OVERLOAD) UNSTABLE<br>• INSTANTANEOUS FAST DOWNWARD (UNDERLOAD) CHANGE(S) | • TOOL MISSING OR TOOL MISSING MATERIAL<br>• TOOL LOOSEN OR DROPPING<br>• WORKPIECE LOOSEN OR MOVING<br>• TOOL WEAR/WORSE/DULL<br>• BRAND NEW TOOL(S) OR FRESH CUTTING EDGE(S)<br>• WRONG TOOL(S)<br>• ABNORMAL CUTTING CYCLE | RED ✓ |
| 27 | 1 | 2 | 2 | [waveform] | • LEVEL DOWNWARD (UNDERLOAD)<br>• UPWARD (OVERLOAD) UNSTABLE<br>• INSTANTANEOUS FAST UPWARD (OVERLOAD) CHANGE(S) | • COLLISION IN SOMEWHERE<br>• TOOL CHIP OR BREAKAGE<br>• HARD LAYER(S) IN MATERIAL<br>• TOOL MISSING OR TOOL MISSING MATERIAL<br>• TOOL LOOSEN OR DROPPING<br>• WORKPIECE LOOSEN OR MOVING<br>• TOOL WEAR/WORSE/DULL<br>• BRAND NEW TOOL(S) OR FRESH CUTTING EDGE(S)<br>• WRONG TOOL(S) | RED ✓ |

*Fig-13*

| | | | | | | |
|---|---|---|---|---|---|---|
| 28 | 1 | 2 | 3 | ![graph] | • LEVEL DOWNWARD (UNDERLOAD)<br>• UPWARD (OVERLOAD) UNSTABLE<br>• INSTANTANEOUS FAST DOWNWARD (UNDERLOAD) AND UPWARD (OVERLOAD) CHANGE(S) | • COLLISION OR IMPACT IN SOMEWHERE<br>• TOOL CHIP OR BREAKAGE<br>• HARD LAYER(S) IN MATERIAL<br>• TOOL MISSING OR TOOL MISSING MATERIAL<br>• TOOL LOOSEN OR DROPPING<br>• WORKPIECE LOOSEN OR MOVING<br>• TOOL WEAR/WORSE/DULL<br>• BRAND NEW TOOL(S) OR FRESH CUTTING EDGE(S)<br>• WRONG TOOL(S) | RED ✓ |
| 29 | 1 | 3 | 0 | ![graph] | • LEVEL DOWNWARD (UNDERLOAD)<br>• DOWNWARD (UNDERLOAD) AND UPWARD (OVERLOAD) UNSTABLE<br>• NO INSTANTANEOUS FAST CHANGE(S) | • UNSTABLE PROCESS<br>• TOOL(S) IS BECOMING DULL OR PART OF TOOL(S) IS WORN<br>• BRAND NEW TOOL(S) OR FRESH CUTTING EDGE(S)<br>• TOOL MISSING OR TOOL MISSING MATERIAL<br>• TOOL LOOSEN OR DROPPING<br>• WORKPIECE LOOSEN OR MOVING<br>• UN-HOMOGENEOUS MATERIAL<br>• WRONG SIZE TOOL(S) | RED |
| 30 | 1 | 3 | 1 | ![graph] | • LEVEL DOWNWARD (UNDERLOAD)<br>• DOWNWARD (UNDERLOAD) AND UPWARD (OVERLOAD) UNSTABLE<br>• INSTANTANEOUS FAST DOWNWARD (UNDERLOAD) CHANGE(S) | • TOOL MISSING OR TOOL MISSING MATERIAL<br>• TOOL LOOSEN OR DROPPING<br>• WORKPIECE LOOSEN OR MOVING<br>• TOOL WEAR/WORSE/DULL<br>• BRAND NEW TOOL(S) OR FRESH CUTTING EDGE(S)<br>• WRONG TOOL(S)<br>• NON-HOMOGENEOUS MATERIAL<br>• ABNORMAL CUTTING CYCLE | RED ✓ |

*Fig-14*

| | | | | | | |
|---|---|---|---|---|---|---|
| 31 | 1 | 3 | 2 | ![graph] | • LEVEL DOWNWARD (UNDERLOAD)<br>• DOWNWARD (UNDERLOAD) AND UPWARD (OVERLOAD) UNSTABLE<br>• INSTANTANEOUS FAST UPWARD (OVERLOAD) CHANGE(S) | • COLLISION IN SOMEWHERE<br>• TOOL CHIP OR BREAKAGE<br>• HARD LAYER(S) IN MATERIAL<br>• BRAND NEW TOOL(S) OR FRESH CUTTING EDGE(S)<br>• TOOL MISSING OR TOOL MISSING MATERIAL<br>• TOOL LOOSEN OR DROPPING<br>• WORKPIECE LOOSEN OR MOVING<br>• TOOL WEAR/WORSE/DULL<br>• WRONG TOOL(S)<br>• UN-HOMOGENEOUS MATERIAL<br><br>RED ✓ |
| 32 | 1 | 3 | 3 | ![graph] | • LEVEL DOWNWARD (UNDERLOAD)<br>• DOWNWARD (UNDERLOAD) AND UPWARD (OVERLOAD) UNSTABLE<br>• INSTANTANEOUS FAST DOWNWARD (UNDERLOAD) AND UPWARD (OVERLOAD) CHANGE(S) | • COLLISION OR IMPACT IN SOMEWHERE<br>• TOOL CHIP OR BREAKAGE<br>• HARD LAYER(S) IN MATERIAL<br>• BRAND NEW TOOL(S) OR FRESH CUTTING EDGE(S)<br>• TOOL MISSING OR TOOL MISSING MATERIAL<br>• TOOL LOOSEN OR DROPPING<br>• WORKPIECE LOOSEN OR MOVING<br>• TOOL WEAR/WORSE/DULL<br>• WRONG TOOL(S)<br>• UN-HOMOGENEOUS MATERIAL<br><br>RED ✓ |
| 33 | 2 | 0 | 0 | ![graph] | • LEVEL DOWNWARD (UNDERLOAD)<br>• DOWNWARD (UNDERLOAD) AND UPWARD (OVERLOAD) UNSTABLE<br>• INSTANTANEOUS FAST DOWNWARD | • TOOL WEAR/WORSE/DULL<br>• WORKPIECE LOOSEN OR MOVING<br>• HARD MATERIAL<br>• WRONG SIZE(BIGGER) TOOL(S)<br>• OVERLOAD FOR ANY REASON<br><br>YELLOW |

Fig-15

| | | | | | |
|---|---|---|---|---|---|
| 34 | 2 | 0 | 1 | ![signal] | • LEVEL UPWARD (OVERLOAD)<br>• INSTANTANEOUS FAST DOWNWARD (UNDERLOAD) CHANGE(S) | • TOOL WEAR/WORSE/DULL<br>• TOOL MISSING MATERIAL<br>• WORKPIECE LOOSEN OR MOVING<br>• TOOL LOOSEN OR DROPPING<br>• WRONG SIZE (BIGGER) TOOL(S)<br>• HARD MATERIAL<br>• OVERLOAD FOR ANY REASON | RED | ✓ |
| 35 | 2 | 0 | 2 | ![signal] | • LEVEL UPWARD (OVERLOAD)<br>• INSTANTANEOUS FAST UPWARD (OVERLOAD) CHANGE(S) | • COLLISION IN SOMEWHERE<br>• TOOL CHIP OR BEAKAGE<br>• TOOL WEAR/WORSE/DULL<br>• HARD MATERIAL<br>• WRONG SIZE (BIGGER) TOOL(S)<br>• OVERLOAD FOR ANY REASON | RED | ✓ |
| 36 | 2 | 0 | 3 | ![signal] | • LEVEL UPWARD (OVERLOAD)<br>• INSTANTANEOUS FAST DOWNWARD (UNDERLOAD) AND UPWARD (OVERLOAD) CHANGE(S) | • COLLISION OR IMPACT IN SOMEWHERE<br>• TOOL CHIP OR BREAKAGE<br>• TOOL WEAR/WORSE/DULL<br>• WORKPIECE LOOSEN OR MOVING<br>• TOOL LOOSEN OR DROPPING<br>• HARD MATERIAL<br>• WRONG SIZE (BIGGER) TOOL(S)<br>• OVERLOAD FOR ANY REASON | RED | ✓ |
| 37 | 2 | 1 | 0 | ![signal] | • LEVEL UPWARD (OVERLOAD)<br>• DOWNWARD (UNDERLOAD)<br>• UNSTABLE<br>• NO INSTANTANEOUS FAST CHANGE(S) | • UNSTABLE PROCESSS<br>• TOOL WEAR/WORSE/DULL<br>• WORKPIECE LOOSEN OR MOVING<br>• TOOL LOOSEN OR DROPPING<br>• TOOL MISSING OR TOOL(S) MISSING MATERIAL<br>• WRONG SIZE TOOL(S)<br>• BRAND NEW TOOL(S) OR FRESH CUTTING EDGE(S)<br>• UN-HOMOGENEOUS MATERIAL | YELLOW | |

*Fig-16*

| | | | | | | | |
|---|---|---|---|---|---|---|---|
| 38 | 2 | 1 | 1 | (waveform) | • LEVEL UPWARD (OVERLOAD)<br>• DOWNWARD (UNDERLOAD) UNSTABLE<br>• INSTANTANEOUS FAST DOWNWARD (UNDERLOAD) CHANGE(S) | • TOOL MISSING OR TOOL(S) MISSING MATERIAL<br>• TOOL LOOSEN OR DROPPING<br>• WORKPIECE LOOSEN OR MOVING<br>• TOOL WEAR/WORSE/DULL<br>• WRONG TOOL(S)<br>• POROUS OR SOFT LAYER(S) IN MATERIAL<br>• BRAND NEW TOOL(S) OR FRESH CUTTING EDGE(S)<br>• ABNORMAL CUTTING CYCLE | RED | ✓ |
| 39 | 2 | 1 | 2 | (waveform) | • LEVEL UPWARD (OVERLOAD)<br>• DOWNWARD (UNDERLOAD) UNSTABLE<br>• INSTANTANEOUS FAST UPWARD (OVERLOAD) CHANGE(S) | • COLLISION IN SOMEWHERE<br>• TOOL CHIP OR BREAKAGE<br>• HARD SPOT(S) IN MATERIAL<br>• TOOL WEAR/WORSE/DULL<br>• WORKPIECE LOOSEN OR MOVING<br>• TOOL LOOSEN OR DROPPING<br>• TOOL MISSING OR TOOL(S) MISSING MATERIAL<br>• HARD MATERIAL<br>• WRONG SIZE (BIGGER) TOOL(S) | RED | ✓ |
| 40 | 2 | 1 | 3 | (waveform) | • LEVEL UPWARD (OVERLOAD)<br>• DOWNWARD (UNDERLOAD) UNSTABLE<br>• INSTANTANEOUS FAST DOWNWARD (UNDERLOAD) AND UPWARD (OVERLOAD) CHANGE(S) | • COLLISION OR IMPACT IN SOMEWHERE<br>• TOOL CHIP OR BREAKAGE<br>• TOOL WEAR/WORSE/DULL<br>• WORKPIECE LOOSEN OR MOVING<br>• OVERLOAD FOR ANY REASON<br>• TOOL LOOSEN OR DROPPING<br>• TOOL MISSING OR TOOL(S) MISSING MATERIAL<br>• HARD MATERIAL<br>• WRONG SIZE (BIGGER) TOOL(S) | RED | ✓ |
| 41 | 2 | 2 | 0 | (waveform) | • LEVEL UPWARD (OVERLOAD)<br>• UPWARD (OVERLOAD) UNSTABLE<br>• NO INSTANTANEOUS FAST CHANGE(S) | • TYPICAL OVERLOAD<br>• TOOL WEAR/WORSE/DULL<br>• HARD MATERIAL<br>• WRONG SIZE (BIGGER) TOOL(S)<br>• WORKPIECE LOOSEN OR MOVING<br>• OVERLOAD FOR ANY REASON | YELLOW | |

*Fig-17*

| | | | | | | |
|---|---|---|---|---|---|---|
| 42 | 2 | 2 | 1 | ~graph~ | • LEVEL UPWARD (OVERLOAD)<br>• UPWARD (OVERLOAD) UNSTABLE<br>• INSTANTANEOUS FAST DOWNWARD (UNDERLOAD) CHANGE(S) | • TOOL WEAR/WORSE/DULL<br>• HARD MATERIAL<br>• WRONG SIZE (BIGGER) TOOL(S)<br>• WORKPIECE LOOSEN OR MOVING<br>• TOOL LOOSEN OR DROPPING<br>• OVERLOAD FOR ANY REASON | RED ✓ |
| 43 | 2 | 2 | 2 | ~graph~ | • LEVEL UPWARD (OVERLOAD)<br>• UPWARD (OVERLOAD) UNSTABLE<br>• INSTANTANEOUS FAST UPWARD (OVERLOAD) CHANGE(S) | • TYPICAL OVERLOAD<br>• COLLISION IN SOMEWHERE<br>• TOOL CHIP OR BREAKAGE<br>• HARD LAYER(S) IN MATERIAL<br>• TOOL WEAR/WORSE/DULL<br>• WORKPIECE LOOSEN OR MOVING<br>• WRONG SIZE (BIGGER) TOOL(S)<br>• HARD MATERIAL<br>• OVERLOAD FOR ANY REASON | RED ✓ |
| 44 | 2 | 2 | 3 | ~graph~ | • LEVEL UPWARD (OVERLOAD)<br>• UPWARD (OVERLOAD) UNSTABLE<br>• INSTANTANEOUS FAST DOWNWARD (UNDERLOAD) AND UPWARD (OVERLOAD) CHANGE(S) | • TYPICAL OVERLOAD<br>• COLLISION OR IMPACT IN SOMEWHERE<br>• TOOL CHIP OR BREAKAGE<br>• HARD LAYER(S) IN MATERIAL<br>• TOOL WEAR/WORSE/DULL<br>• WORKPIECE LOOSEN OR MOVING<br>• WRONG SIZE (BIGGER) TOOL(S)<br>• HARD MATERIAL<br>• OVERLOAD FOR ANY REASON | RED ✓ |
| 45 | 2 | 3 | 0 | ~graph~ | • LEVEL UPWARD (OVERLOAD)<br>• DOWNWARD (UNDERLOAD) AND UPWARD (OVERLOAD) UNSTABLE<br>• NO INSTANTANEOUS FAST CHANGE(S) | • TYPICAL OVERLOAD<br>• TOOL WEAR/WORSE/DULL<br>• NON-HOMOGENEOUS MATERIAL<br>• WRONG SIZE (BIGGER) TOOL(S)<br>• WORKPIECE LOOSEN OR MOVING<br>• OVERLOAD FOR ANY REASON<br>• ABNORMAL CYCLE | RED |

*Fig-18*

| | | | | | | |
|---|---|---|---|---|---|---|
| 46 | 2 | 3 | 1 | [waveform: level with downward dip] | • LEVEL UPWARD (OVERLOAD)<br>• DOWNWARD (UNDERLOAD) AND UPWARD (OVERLOAD) UNSTABLE<br>• INSTANTANEOUS FAST DOWNWARD (UNDERLOAD) CHANGE(S) | • TOOL WEAR/WORSE/DULL<br>• WORKPIECE LOOSEN OR MOVING<br>• TOOL LOOSEN OR DROPPING<br>• HARD MATERIAL<br>• WRONG SIZE (BIGGER) TOOL(S)<br>• OVERLOAD FOR ANY REASON<br>• ABNORMAL CUTTING CYCLE | RED ✓ |
| 47 | 2 | 3 | 2 | [waveform: level with upward spike] | • LEVEL UPWARD (OVERLOAD)<br>• DOWNWARD (UNDERLOAD) AND UPWARD (OVERLOAD) UNSTABLE<br>• INSTANTANEOUS FAST UPWARD (OVERLOAD) CHANGE(S) | • COLLISION IN SOMEWHERE<br>• TOOL CHIP OR BREAKAGE<br>• TOOL WEAR/WORSE/DULL<br>• TOOL LOOSEN OR DROPPING<br>• WORKPIECE LOOSEN OR MOVING<br>• HARD LAYERS IN MATERIAL<br>• WRONG SIZE (BIGGER) TOOL(S)<br>• OVERLOAD FOR ANY REASON<br>• UN-HOMOGENEOUS MATERIAL<br>• ABNORMAL CUTTING CYCLE | RED ✓ |
| 48 | 2 | 3 | 3 | [waveform: level with downward dip and upward spike] | • LEVEL UPWARD (OVERLOAD)<br>• DOWNWARD (UNDERLOAD) AND UPWARD (OVERLOAD) UNSTABLE<br>• INSTANTANEOUS FAST DOWNWARD (UNDERLOAD) AND UPWARD (OVERLOAD) CHANGE(S) | • COLLISION OR IMPACT IN SOMEWHERE<br>• TOOL CHIP OR BREAKAGE<br>• TOOL WEAR/WORSE/DULL<br>• TOOL LOOSEN OR DROPPING<br>• WORKPIECE LOOSEN OR MOVING<br>• WRONG SIZE (BIGGER) TOOL(S)<br>• OVERLOAD FOR ANY REASON<br>• UN-HOMOGENEOUS MATERIAL<br>• ABNORMAL CUTTING CYCLE | RED ✓ |
| 49 | 3 | 0 | 0 | [waveform: steady with large amplitude] | • BIG AMPLITUDE<br>• STABLE PROCESS<br>• NO INSTANTANEOUS FAST CHANGE(S) | • DULL TOOLS<br>• STRONG VIBRATION<br>• UN-HOMOGENEOUS MATERIAL | YELLOW |

Fig-19

| | | | | | | | |
|---|---|---|---|---|---|---|---|
| 50 | 3 | 0 | 1 | 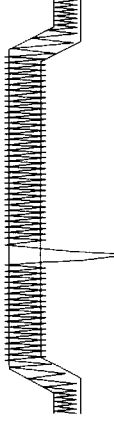 | • BIG AMPLITUDE<br>• INSTANTANEOUS FAST DOWNWARD (UNDERLOAD) CHANGE(S) | • DULL TOOLS<br>• STRONG VIBRATION<br>• TOOL LOOSEN OR DROPPING<br>• WORKPIECE LOOSEN OR MOVING<br>• TOOL MISSING OR TOOL MISSING MATERIAL | RED | ✓ |
| 51 | 3 | 0 | 2 | 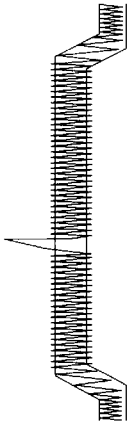 | • BIG AMPLITUDE<br>• INSTANTANEOUS FAST UPWARD (OVERLOAD) CHANGE(S) | • COLLISION IN SOMEWHERE<br>• TOOL CHIP OR BREAKAGE<br>• DULL TOOLS<br>• STRONG VIBRATION<br>• HARD SPOT(S) IN MATERIAL | RED | ✓ |
| 52 | 3 | 0 | 3 | 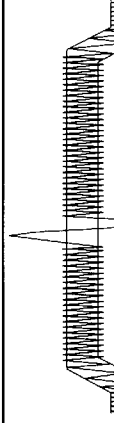 | • BIG AMPLITUDE<br>• INSTANTANEOUS FAST DOWNWARD (UNDERLOAD) AND UPWARD (OVERLOAD) CHANGE(S) | • COLLISION OR IMPACT IN SOMEWHERE<br>• TOOL CHIP OR BREAKAGE<br>• TOOL LOOSEN OR DROPPING<br>• WORKPIECE LOOSEN OR MOVING<br>• DULL TOOLS<br>• STRONG VIBRATION | RED | ✓ |
| 53 | 3 | 1 | 0 |  | • BIG AMPLITUDE<br>• DOWNWARD (UNDERLOAD) UNSTABLE<br>• NO INSTANTANEOUS FAST CHANGE(S) | • DULL TOOLS<br>• STRONG VIBRATION<br>• TOOL LOOSEN OR DROPPING<br>• WORKPIECE LOOSEN OR MOVING<br>• TOOL MISSING OR TOOL(S) MISSING MATERIAL<br>• WRONG SIZE (SMALLER) TOOL(S)<br>• BRAND NEW TOOL(S) OR FRESH CUTTING EDGE(S)<br>• UN-HOMOGENEOUS MATERIAL | RED | |

*Fig-20*

| | | | | | | |
|---|---|---|---|---|---|---|
| 54 | 3 | 1 | 1 | ⎍⎍⎍⎍_⎍⎍⎍⎍ (waveform) | • BIG AMPLITUDE<br>• DOWNWARD (UNDERLOAD)<br>   UNSTABLE<br>• INSTANTANEOUS FAST DOWNWARD (UNDERLOAD) CHANGE(S) | • TOOL LOOSEN OR DROPPING<br>• WORKPIECE LOOSEN OR MOVING<br>• TOOL MISSING OR TOOL(S) MISSING MATERIAL<br>• DULL TOOLS<br>• STRONG VIBRATION<br>• WRONG SIZE (SMALLER) TOOL(S)<br>• BRAND NEW TOOL(S) OR FRESH CUTTING EDGE(S)<br>• POROUS OR SOFT LAYER(S) IN MATERIAL<br>• ABNORMAL CUTTING CYCLE | RED | ✓ |
| 55 | 3 | 1 | 2 | ⎍⎍⎍⎍^⎍⎍⎍⎍ (waveform) | • BIG AMPLITUDE<br>• DOWNWARD (UNDERLOAD)<br>   UNSTABLE<br>• INSTANTANEOUS FAST UPWARD (OVERLOAD) CHANGE(S) | • COLLISION IN SOMEWHERE<br>• TOOL CHIP OR BREAKAGE<br>• TOOL LOOSEN OR DROPPING<br>• WORKPIECE LOOSEN OR MOVING<br>• TOOL MISSING OR TOOL(S) MISSING MATERIAL<br>• DULL TOOLS<br>• STRONG VIBRATION<br>• WRONG SIZE (SMALLER) TOOL(S)<br>• BRAND NEW TOOL(S) OR FRESH CUTTING EDGE(S)<br>• HARD SPOT(S) IN MATERIAL<br>• ABNORMAL CUTTING CYCLE | RED | ✓ |
| 56 | 3 | 1 | 3 | ⎍⎍⎍⎍^v⎍⎍⎍⎍ (waveform) | • BIG AMPLITUDE<br>• DOWNWARD (UNDERLOAD)<br>   UNSTABLE<br>• INSTANTANEOUS FAST DOWNWARD (UNDERLOAD) AND UPWARD (OVERLOAD) CHANGE(S) | • COLLISION OR IMPACT IN SOMEWHERE<br>• TOOL CHIP OR BREAKAGE<br>• DULL TOOLS<br>• STRONG VIBRATION<br>• TOOL LOOSEN OR DROPPING<br>• WORKPIECE LOOSEN OR MOVING<br>• TOOL MISSING OR TOOL(S) MISSING MATERIAL<br>• BRAND NEW TOOL(S) OR FRESH CUTTING EDGE(S)<br>• ABNORMAL CUTTING CYCLE | RED | ✓ |

*Fig-21*

| | | | | | | |
|---|---|---|---|---|---|---|
| 57 | 3 | 2 | 0 | (waveform) | • BIG AMPLITUDE<br>• UPWARD (OVERLOAD) UNSTABLE<br>• NO INSTANTANEOUS FAST CHANGE(S) | • DULL TOOLS<br>• STRONG VIBRATION<br>• WORKPIECE LOOSEN OR MOVING<br>• HARD LAYER(S) IN MATERIAL<br>• WRONG SIZE (BIGGER TOOL(S)) | | |
| 58 | 3 | 2 | 1 | (waveform) | • BIG AMPLITUDE<br>• UPWARD (OVERLOAD) UNSTABLE<br>• INSTANTANEOUS FAST DOWNWARD (UNDERLOAD) CHANGE(S) | • WORKPIECE LOOSEN OR MOVING<br>• TOOL LOOSEN OR DROPPING<br>• TOOL MISSING OR TOOL MISSING MATERIAL<br>• DULL TOOLS<br>• STRONG VIBRATION<br>• HARD LAYER(S) IN MATERIAL<br>• WRONG SIZE (BIGGER TOOL(S))<br>• OVERLOAD FOR ANY REASON<br>• ABNORMAL CUTTING CYCLE | RED | ✓ |
| 59 | 3 | 2 | 2 | (waveform) | • BIG AMPLITUDE<br>• UPWARD (OVERLOAD) UNSTABLE<br>• INSTANTANEOUS FAST UPWARD (OVERLOAD) CHANGE(S) | • COLLISION IN SOMEWHERE<br>• TOOL CHIP OR BREAKAGE<br>• DULL TOOLS<br>• STRONG VIBRATION<br>• WORKPIECE LOOSEN OR MOVING<br>• HARD LAYER(S) IN MATERIAL<br>• WRONG SIZE (BIGGER TOOL(S))<br>• OVERLOAD FOR ANY REASON<br>• ABNORMAL CUTTING CYCLE | RED | ✓ |
| 60 | 3 | 2 | 3 | (waveform) | • BIG AMPLITUDE<br>• UPWARD (OVERLOAD) UNSTABLE<br>• INSTANTANEOUS FAST DOWNWARD (UNDERLOAD) AND UPWARD (OVERLOAD) CHANGE(S) | • COLLISION IN SOMEWHERE<br>• TOOL CHIP OR BREAKAGE<br>• DULL TOOLS<br>• STRONG VIBRATION<br>• WORKPIECE LOOSEN OR MOVING<br>• HARD LAYER(S) IN MATERIAL<br>• WRONG SIZE (BIGGER TOOL(S))<br>• OVERLOAD FOR ANY REASON<br>• ABNORMAL CUTTING CYCLE | RED | ✓ |

Fig-22

| 61 | 3 | 3 | 0 | ![waveform] | • BIG AMPLITUDE<br>• DOWNWARD (UNDERLOAD) AND UPWARD (OVERLOAD) UNSTABLE<br>• NO INSTANTANEOUS FAST CHANGE(S) | • DULL TOOLS<br>• STRONG VIBRATION<br>• TOOL LOOSEN OR DROPPING<br>• WORKPIECE LOOSEN OR MOVING<br>• UN-HOMOGENEOUS MATERIAL<br>• ABNORMAL CUTTING CYCLE | RED | |
|---|---|---|---|---|---|---|---|---|
| 62 | 3 | 3 | 1 | ![waveform] | • BIG AMPLITUDE<br>• DOWNWARD (UNDERLOAD) AND UPWARD (OVERLOAD) UNSTABLE<br>• INSTANTANEOUS FAST DOWNWARD (UNDERLOAD) CHANGE(S) | • TOOL LOOSEN OR DROPPING<br>• WORKPIECE LOOSEN OR MOVING<br>• TOOL MISSING OR TOOL BREAKAGE MATERIAL<br>• DULL TOOLS<br>• STRONG VIBRATION<br>• UN-HOMOGENEOUS MATERIAL<br>• ABNORMAL CUTTING CYCLE | RED | ✓ |
| 63 | 3 | 3 | 2 | ![waveform] | • BIG AMPLITUDE<br>• DOWNWARD (UNDERLOAD) AND UPWARD (OVERLOAD) UNSTABLE<br>• INSTANTANEOUS FAST UPWARD (OVERLOAD) CHANGE(S) | • COLLISION IN SOMEWHERE<br>• TOOL CHIP OR BREAKAGE<br>• DULL TOOLS<br>• STRONG VIBRATION<br>• TOOL LOOSEN OR DROPPING<br>• WORKPIECE LOOSEN OR MOVING<br>• UN-HOMOGENEOUS MATERIAL<br>• ABNORMAL CUTTING CYCLE | RED | ✓ |
| 64 | 3 | 3 | 3 | ![waveform] | • BIG AMPLITUDE<br>• DOWNWARD (UNDERLOAD) AND UPWARD (OVERLOAD) UNSTABLE<br>• INSTANTANEOUS FAST DOWNWARD (UNDERLOAD) AND UPWARD (OVERLOAD) CHANGE(S) | • COLLISION OR IMPACT IN SOMEWHERE<br>• TOOL CHIP OR BREAKAGE<br>• DULL TOOLS<br>• STRONG VIBRATION<br>• TOOL LOOSEN OR DROPPING<br>• WORKPIECE LOOSEN OR MOVING<br>• TOOL MISSING OR TOOL BREAKAGE MATERIAL<br>• UN-HOMOGENEOUS MATERIAL<br>• ABNORMAL CUTTING CYCLE | RED | ✓ |

Fig-23

DIAGNOSTIC RULE BASE TOOL CONDITION MONITORING SYSTEM

BACKGROUND OF THE INVENTION

The present invention relates to a tool monitoring system for monitoring the condition of an electric motor driven tool performing a cyclical operation.

Tool condition monitoring is one of the major concerns in modem machining operations, especially in machining operations for mass production. Failure to detect tool failure and wear leads to poor product quality and can even damage machine tools. On the other hand, a false detection of tool failure or wear may cause an unnecessary interruption of an entire production. Both can result in significant monetary loss.

Known tool monitoring systems include systems for "on-line tool condition monitoring." In on-line tool condition monitoring, the tool is monitored for defects after each cut or cycle. These tool monitoring systems typically use optical sensors or laser optical sensors which measure the geometry of the tool after each cut. However, on-line tool condition monitoring can only detect catastrophic failure of a tool after a cut and cannot monitor the gradual wear of a tool or predict the tool's failure. Further, these systems are vulnerable to chips, coolant, and environmental noises.

Other known methods for tool condition monitoring attempt to predict tool condition based on various sensor signals such as cutting force, acoustic emission, and vibration. However, sensors for monitoring cutting force are too expensive to use with multiple stations and multiple spindles. Acoustic emission and vibration sensors require additional wiring and are vulnerable to various noises.

Some monitoring systems monitor power consumption (or motor current) of the tool. As the tool wears (or if it fails) its power consumption changes. However, the power signals are complicated and the power signals to provide a reliable, accurate indication of it has proven difficult to use. The power signal does contain some "noise" due to factors other than tool condition. Typically, these systems sets a range of signal that a monitored signal should fall within. When the monitored signal is outside this range, a worn tool or failure is indicated.

One major problem with monitoring the power consumption of the motor is that occasional spikes are experienced in a machine tool even under normal condition. The spikes can falsely indicate that the tool is worn. However, if the threshold is increased to prevent false signals, a worn tool may go undetected.

The inventors of the present invention previously developed a tool monitoring system which operates generally in two modes: learning mode and monitoring mode. In learning mode, the tool monitoring system gathers statistical data on the power consumption of tools of the selected tool type during learning cycles. A power threshold is generated based upon the statistical data. The tool monitoring system then counts the number of crossings by each of the learning cycles of the power threshold and generates statistical data regarding the number of crossings. Preferably, the mathematical operation of wavelet packet transform is used to calculate the power threshold. Feature wavelet packets of the power consumption signal of the tool are calculated. The power consumption signal is then reconstructed from the feature wavelet packets and used to determine the power threshold. In monitor mode, the tool monitoring system counts the number of crossings of the power threshold by the power consumption signal of a tool in operation. The tool monitoring system identifies a worn tool when the number of crossings increases to a certain number relative to the crossings by the learning cycles. This previous invention was disclosed and claimed in U.S. Pat. No. 5,587,931.

SUMMARY OF THE INVENTION

The present invention provides a real time tool monitoring system which continuously monitors a plurality of characteristics of the power consumption of the tool during operation in order to diagnose the condition of the tool and the likely cause of any problem.

The tool monitoring system of the present invention monitors a plurality of characteristics of the power consumption of the tool during performance of the cyclical task. The system diagnoses the condition of the tool based upon the plurality of characteristics of the power consumption, including the existence or absence of each of the plurality of characteristics.

Preferably, the system is first operated in a "learning mode," in which one or more tools of a known condition are monitored for a plurality of cycles. A plurality of characteristics of the power consumption of the known tools evaluated statistically in order to generate a plurality of threshold values.

First, a power threshold having an upper limit and a lower limit is generated based upon the average power consumption. The power threshold and average power consumption is a function of time over the cyclical task. During each cycle of the tool, the power consumption will cross the power threshold a plurality of times. Statistical information regarding the number of crossings by the power consumption of the upper and lower limits by the known tools is gathered to establish a threshold number of crossings of the upper limit and a threshold number of crossings of the lower limit.

Further, extreme high and low values, i.e. "spikes," in the power consumption are also monitored in the known tools and evaluated statistically to generate maximum and minimum permissible values. Again, this threshold is a function of time over the cyclical task.

The amount of time that the power consumption stays outside the power threshold, i.e. above the upper limit or below the lower limit, is also monitored statistically to generate a threshold time value.

The values gathered in the learning mode are then utilized to generate a diagnostic rule base which includes every possible combination of the plurality of characteristics monitored, i.e. number of crossings, maximum & minimum instantaneous values, and time outside threshold. Further, for each characteristic, there are four possibilities. First, the characteristic may be absent, i.e. the number of crossings has not been exceeded, the maximum and minimum permissible values have not been crossed and the time outside the threshold has not been exceeded. When the characteristic exists there are three more possibilities: the characteristic is occurring below the lower limit of the power threshold, above the upper limit of the power threshold or both above and below the power threshold. Thus, for the three characteristics monitored in the preferred embodiment, there are sixty four possible combinations which are associated with different tool conditions in the rule base.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 7 is a chart showing the diagnosis rule base for rules 1–4.

FIG. 8 is a chart of the diagnosis rule base of FIG. 7 for rules 5–8.

FIG. 9 is a chart of the diagnosis rule base of FIG. 7 for rules 9–13.

FIG. 10 is a chart of the diagnosis rule base of FIG. 7 for rules 14–17.

FIG. 11 is a chart of the diagnosis rule base of FIG. 7 for rules 18–21.

FIG. 12 is a chart of the diagnosis rule base of FIG. 7 for rules 22–24.

FIG. 13 is a chart of the diagnosis rule base of FIG. 7 for rules 25–27.

FIG. 14 is a chart of the diagnosis rule base of FIG. 7 for rules 28–30.

FIG. 15 is a chart of the diagnosis rule base of FIG. 7 for rules 31–33.

FIG. 16 is a chart of the diagnosis rule base of FIG. 7 for rules 34–37.

FIG. 17 is a chart of the diagnosis rule base of FIG. 7 for rules 38–41.

FIG. 18 is a chart of the diagnosis rule base of FIG. 7 for rules 42–45.

FIG. 19 is a chart of the diagnosis rule base of FIG. 7 for rules 46–49.

FIG. 20 is a chart of the diagnosis rule base of FIG. 7 for rules 50–53.

FIG. 21 is a chart of the diagnosis rule base of FIG. 7 for rules 54–56.

FIG. 22 is a chart of the diagnosis rule base of FIG. 7 for rules 57–60.

FIG. 23 is a chart of the diagnosis rule base of FIG. 7 for rules 61–64.

DETAILED DESCRIPTION OF A PREFERRED EMBODIMENT

Figure 1:
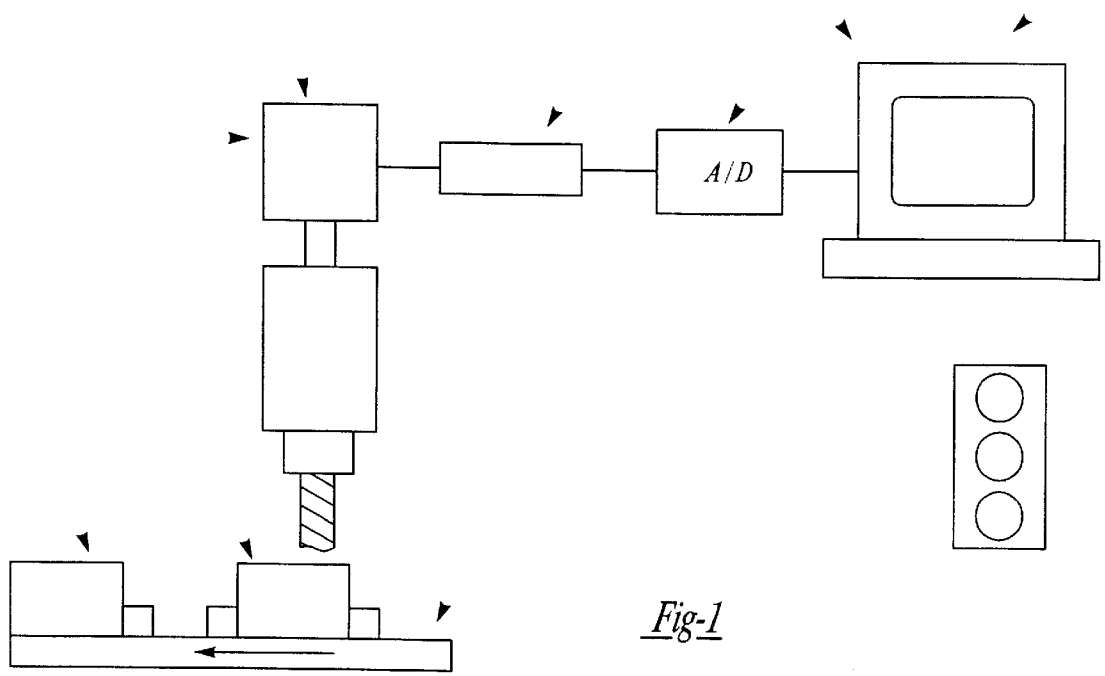
FIG. 1 illustrates a tool monitoring system according to the present invention, monitoring the power consumption of a machine tool machining a series of workpieces.

FIG. 1 shows a tool monitoring system 10 according to the present invention including a current transducer 12 connected to an analog-to-digital converter 14 and a CPU 16. The CPU 16 is also connected to a plurality of condition indicator lights 17a–c, which are preferably green, yellow and red, respectively. The tool monitoring system 10 is shown monitoring a machine tool 18 having an electric motor 20 driving a tool 22. For purposes of illustration, the machine tool 18 is shown machining a series of workpieces 24 being moved along a conveyor system 26. As will become apparent, the tool monitoring system 10 of the present invention can be used with any selected tool type using an electric motor and performing a repetitive, cyclical task.

In operation, the motor 20 and tool 22 are repeatedly loaded to cut each workpiece 24, and then the conveyor system 26 positions another workpiece 24 to the machine tool 18. The current transducer 12 continuously indicates the power consumption of the motor 20 by sending a power consumption signal to the analog-to-digital converter 14, which converts the power consumption signal into a format readable by the CPU 16. The analog-to-digital converter 14 sends a digital signal representing the amplitude of the power consumption signal at a series of current time segments. The digitized power consumption signal is stored in the CPU 16 and associated with its particular time segment, relative to the machine tool cycle.

Figure 2:
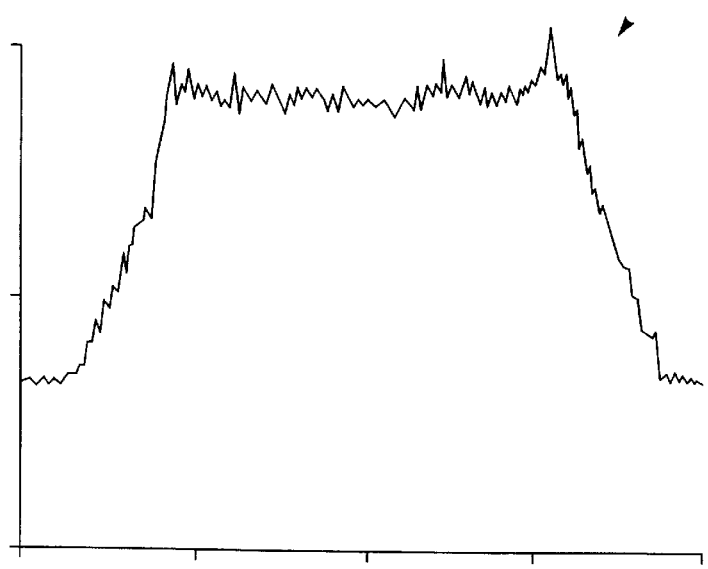
FIG. 2 illustrates the power signal from one cycle of the machine tool as received by the tool monitoring system of FIG. 1.

FIG. 2 shows one cycle of the power consumption signal 28 of the machine tool 18 of FIG. 1, as received by the CPU 16. The machining operation is in the form of a cycle starting from tool engagement and ending with tool withdrawal. At the beginning of the cycle, the tool 22 is not engaging the workpiece 24 and the power consumption signal 28 is at idling power 30. During the initial engagement 32 of the tool 22 with the workpiece 24, the power consumption signal 28 rises. When the tool 22 is fully engaged in the workpiece 24, the power consumption signal 28 reaches full engagement consumption 34. At full engagement 34, the power consumption signal 28 reaches a level and remains relatively unchanged, though there are fluctuations caused by various noise, such as cutting a hard spot in the workpiece 24. Due to this fluctuation, it has been difficult to use a power signal to accurately predict tool condition. High "spikes" may occur in the signal occasionally even though the tool is not worn. After completion of machining the tool is withdrawn. During withdrawal 36 the power consumption signal 28 decreases steadily and finally returns to idling power 38.

As will be explained in detail below, the tool monitoring system 10 according to the present invention generally operates in two modes: a learning mode and a monitoring mode. In learning mode, the tool monitoring system 10 preferably receives data from several sample cycles of machine tools 18 of the selected tool type. Information related to the power consumption during each cycle run by each machine tool 18 is stored to develop expected signal ranges, or thresholds, and other statistical values. Then in monitoring mode, the tool monitoring system 10 compares the power consumption signal of a machine tool 18 with data gathered in the learning mode and diagnoses the condition of the machine tool 18 for each cycle. The determination is made by comparing the signal to the expected learning cycle, signal ranges, or thresholds and other statistical data gathered from tools of a known condition. Since the thresholds are developed by samples, they are more accurate than prior art "selected" thresholds.

Figure 3:
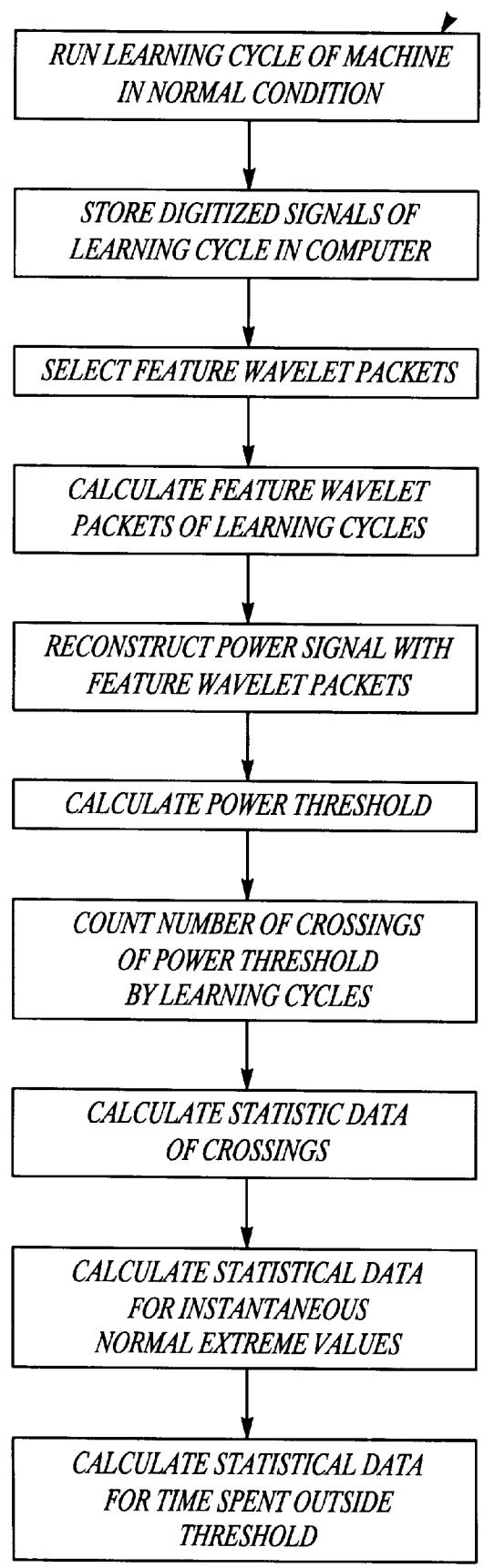
FIG. 3 is a flow chart of the tool monitoring system of FIG. 1 in its learning mode.

FIG. 3 shows a flow chart for the learning mode 40 of the tool monitoring system 10 of FIG. 1. In learning mode 40, numerous learning cycles of a plurality of tools 22 of the selected tool type are run in 42. The tool 22 is selected to be a new tool or in normal condition. The power consumption signals 28 of the learning cycle are digitized by the analog-to-digital converter 14 and stored in the CPU 16 in 44.

The CPU 16 then selects feature components of the power consumption signal 28 in 46. In one preferred embodiment, wavelet transforms are used to break the signal into components, as explained in U.S. Pat. No. 5,587,931 entitled "Tool Condition Monitoring System" which is assigned to the assignee of the present invention and which is hereby incorporated by reference. In 46, the samples of the learning cycle are decomposed into different time-frequency components. The feature wavelet packets are selected from the components to represent the main information about the original power consumption signal 28, thereby the unwanted components of the power consumption signal 28, i.e. noise are filtered out from the signal.

In 50, the CPU 16 reconstructs the power consumption signal 28 of each learning cycle from the selected feature wavelet packets by the inverse of the function used to break the original power signal into components. The reconstructed power consumption signal 28 then contains sufficient information from the original power consumption signal 28, but with reduced noise. Notably, while only some of the learning cycles need be used to select the feature wavelet packets in step 46, preferably all of the learning cycles are used to develop data at step 50. The more cycles utilized, the more accurate the system.

In 52, the CPU 16 generates a power threshold based upon statistical data calculated at 50 from the learning cycles. The power threshold is a function of time over the machine tool cycle and includes an upper limit and a lower limit. The upper and lower limits are not the extremes of the signal, but rather some statistical function of the signal, preferably the average power consumption plus and minus five standard deviations, respectively. The learning cycle signals are expected to occasionally fall outside these thresholds.

In 54, the CPU 16 compares the power threshold to the power consumption signals of the learning cycles. The CPU 16 compares each power consumption signal to the power threshold at each time segment and counts the number of crossings by each power consumption signal. The crossings of the lower limit of the power threshold are preferably counted separately from the crossings of the upper limit of the power threshold.

In 56, the CPU 16 calculates the statistical properties of crossings of the power consumption signals of the learning cycles. If the upper limit crossings are counted separately from lower limit crossings, two means & two standard deviations would also be calculated separately.

In step 57, the CPU 16 calculates the statistical properties of occasional extreme high and low values of the power consumption. Preferably, an instantaneous maximum value is set at the average maximum value plus five standard deviations and an instantaneous minimum value is set at the average minimum value minus five standard deviations.

In step 58, the CPU 16 calculates the statistical properties of the amounts of time that the power consumption signals in the learning mode spend outside the power threshold, i.e. above the upper limit or below the lower limit. Preferably, a threshold time for the lower limit is calculated as the average time spent by power consumption signals below the lower limit plus five standard deviations. Similarly, a threshold time for the upper limit is calculated as the average time spent by power consumption signals above the upper limit plus five standard deviations.

Figure 4:
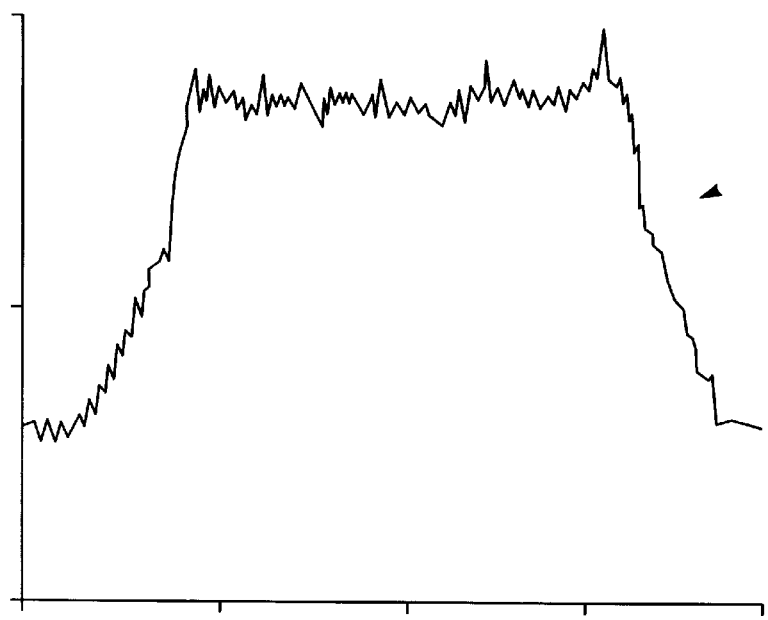
FIG. 4 is a reconstructed power consumption signal of FIG. 2, reconstructed from the feature wavelet packets selected from FIG. 4.

The reconstructed signal 76 of one of the learning cycles, created in step 50, is shown in FIG. 4. The CPU 16 performs the inverse wavelet packet transform on the feature wavelet packets, while setting the other packets to zero. Setting the other packets to zero eliminates noise from the signal. The reconstructed signal 76 therefore comprises the principal components of the power consumption signal 28, without the unwanted components such as various noises.

Figure 5:
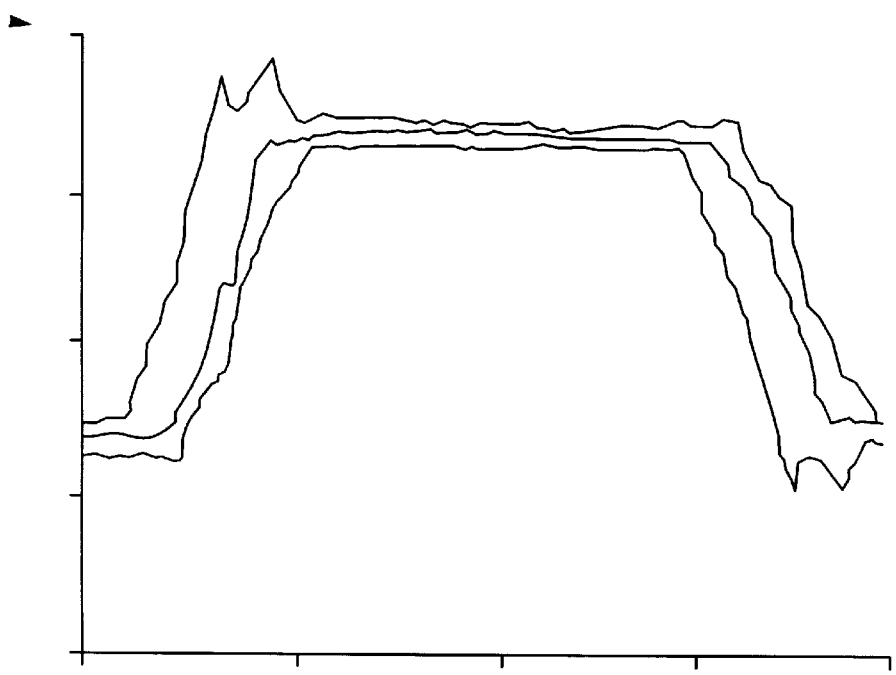
FIG. 5 is a power threshold based upon several reconstructed power consumption signals of the learning cycles.

The power threshold 78 created in step 52 is shown in FIG. 5. The power threshold 78 is based upon statistical properties from the reconstructed power consumption signals 76 from the learning cycles. The power threshold includes an upper limit 80 and a lower limit 82, which are both functions of time over the machine tool cycle. In this embodiment upper limit 80 and lower limit 82 are preferably calculated as plus and minus five standard deviations, respectively, from the mean of the reconstructed power consumption signals 76 of the learning cycles.

FIG. 5 also shows one of the power consumption signals 76 from the learning cycles. In learning mode 40, the CPU 16 compares the power consumption signal 76 from the learning cycles with the power threshold 78 to calculate means and standard deviations for number of crossings of the upper and lower limit 80, 82, time spent above the upper limit 80, time spent below the lower limit 82, and maximum and minimum instantaneous power consumption values. In practice, the power consumption signals from numerous learning cycles would be compared with the power threshold 78.

Figure 6A:
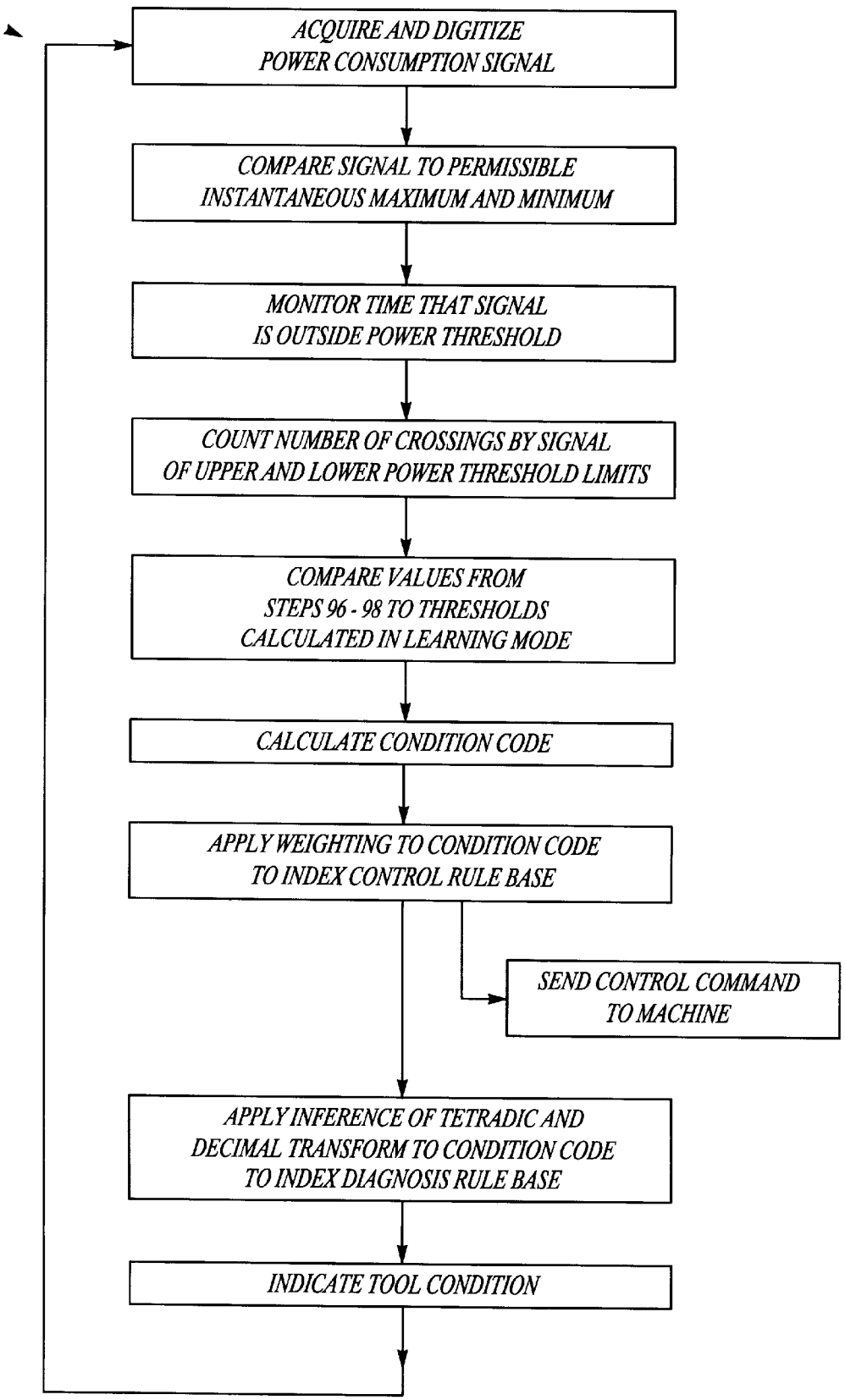
FIG. 6A is a flow chart of the tool monitoring system of FIG. 1 in monitor mode.

After creating a power threshold 78 and threshold values, the tool monitoring system 10 enters the monitoring mode 90, shown in FIG. 6A. In monitor mode 90, the tool monitoring system 10 is again connected to a machine tool 18 of the selected tool type as shown in FIG. 1. Preferably, the same CPU 16 is used in both the learning mode 40 and monitor mode 90, however, it is recognized that the power threshold 78 data could be downloaded to a different CPU for the monitor mode. Moreover, it is preferred that the learning mode be performed at the actual work station where the CPU will be monitoring. Using the actual A/D converter 14 for the learning mode signal acquisition will insure that any individual characteristics of the motor, tool mounts, etc. will be accounted for in the thresholds.

In step 92 of monitor mode 90, the CPU 16 acquires and digitizes the power consumption signal of a machine tool 18 while the machine tool 18 performs its repetitive cyclical machining operations.

In step 96, the power consumption signal is compared to the instantaneous maximum and minimum values calculated in the learning mode. If the power threshold signal falls between the minimum and maximum values, then the value _ma is set to equal 0. If the maximum value is exceeded, then _ma is set to equal 1. If the power consumption signal falls below the minimum value, _ma is set to 2. Finally, if the power consumption signal both exceeds the maximum value and falls below the minimum value, _ma is set to three.

In step 97, the CPU 16 monitors the time that the power consumption signal is outside the power threshold, i.e. above the upper power threshold 80 and below the lower threshold 82. In step 98, the CPU 16 counts the number of crossings by the power consumption signal of the upper and lower threshold limits 80, 82. In step 100, the values and numbers from steps 96, 97, 98 are compared to the threshold numbers. The times are compared to the threshold times. If the power consumption signal stays within the band, _cc is set to 0. If the power consumption signal stays below the lower limit of the power threshold 82 longer than the threshold time for the lower limit of the power threshold calculated in the learning mode, then _cc is set to 1. If the power consumption signal stays above the upper limit of the power threshold for time exceeding the threshold time for the upper limit of the power threshold calculated in the learning mode, then _cc is set to 2. If both times are exceeded, _cc is set to 3.

Also in step 100, the numbers of crossings are compared to the threshold numbers. If the numbers of crossings is less than the threshold numbers of crossings calculated in the learning mode, then _cr is set to 0. If the number of crossings of the lower power threshold limit exceeds the threshold number of crossings of the lower threshold limit calculated in the learning mode, then _cr is set to 1. If the number of crossings of the upper threshold limit exceeds the threshold number of crossings of the upper power threshold limit, then _cr is set to 2. If both thresholds are exceeded, _cr is set to 3.

In step 102, a condition code is calculated from the values for the three characteristics, _cr, _cc and _ma. Preferably, the condition code is a three digit number of the three values, in the form _cr _cc _ma. For example, if _cr=3, _cc=2 and _ma=0, the condition code would be 320.

In step 103, the control rule base is indexed based upon a weighting of the condition code values, which will be described in detail below with respect to FIG. 6B. Based upon the condition code, the tool condition monitoring system 10 will turn on an appropriate condition indicator light 17a–c, and may send a control command to stop the machine in step 104.

In step 106, a different weighting is applied to the condition code utilizing an inference of tetradic and decimal transform. In the preferred embodiment, since each of the characteristics has one of four values, 0–3, each of the characteristics is multiplied by a different multiple of four. The value of _cr is preferably multiplied by $4^2$, or 16. The value of _cc is preferably multiplied by $4^1$, or 4. The value of _ma is preferably multiplied by $4^0$, or 1. The results are then added to provide a unique decimal number for each possible combination of values for the three characteristics. In the preferred embodiment illustrated here, one is added to the resulting number to eliminate a zero value. It should be apparent that if more characteristics are utilized, higher multiples of four would be utilized. Further, the base number, in this case four, is equal to the number of possible values. The base number could be increased to accommodate more possible values. This technique is illustrated below:

ti _cr*$4^2$+_cc*$4^1$+_ma*$4^0$+1=Rule index

_cr*16+_cc*4+_ma*1+1

EXAMPLE 1

_cr=0, _cc=0, _ma=0

0*16+0*4+0*1+1=1

Therefore, diagnosis Rule 1 is indexed.

EXAMPLE 2

_cr=1, _cc=1, _ma=0

1*16+1*4+0*1+1=21

Therefore, diagnosis Rule 21 is indexed.

The Rule calculated using above method is then used to index a rule base in order to diagnose the condition of the machine tool 22. The tool condition is then indicated in step 108, such by a display on CPU 16 of text indicating the condition of the tool 22 and possible problems. The rule base will be described in detail below with respect to FIGS. 7–23.

Figure 6B:
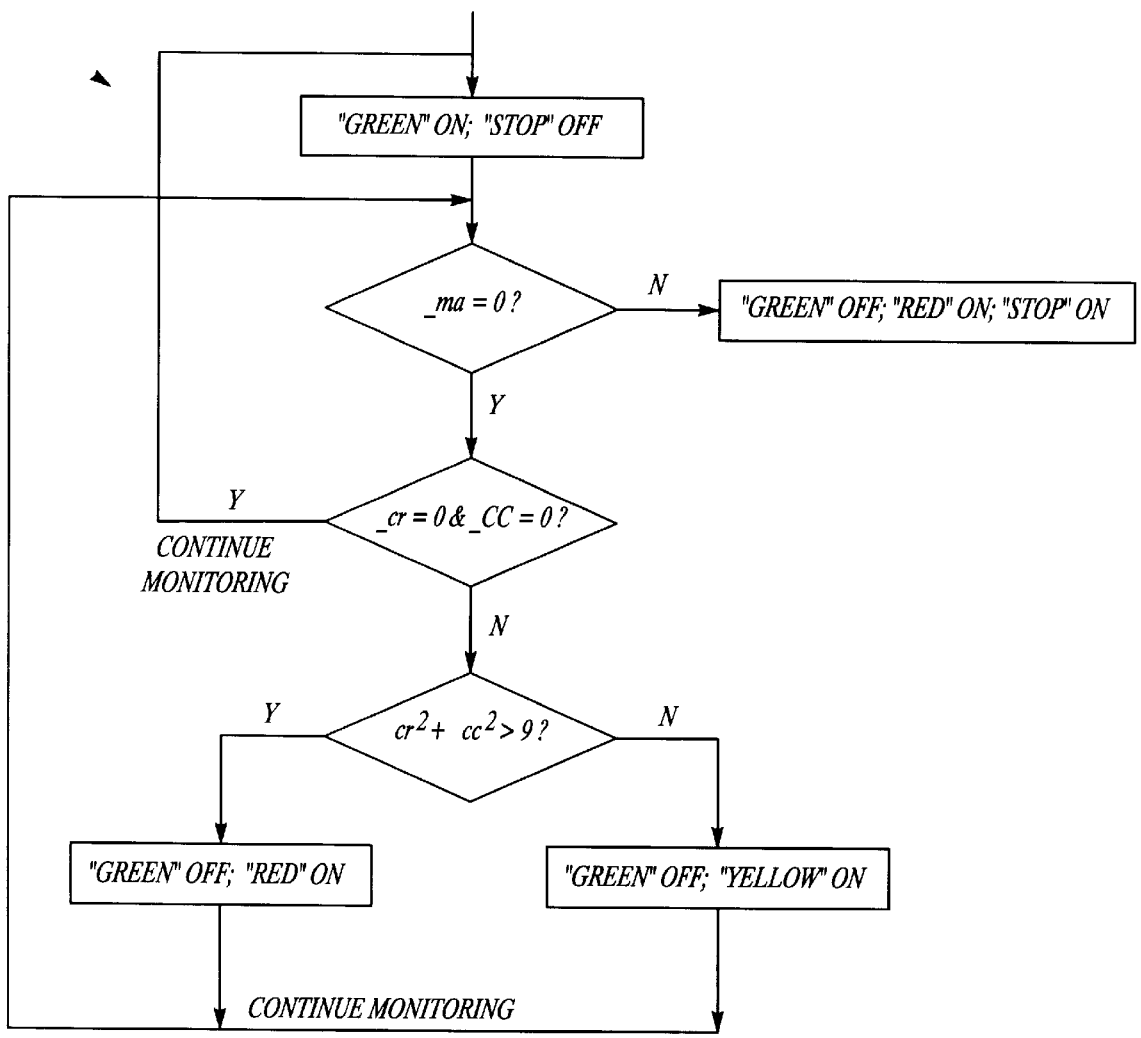
FIG. 6B is a flow chart of a control rule base for the tool monitoring system of FIG. 1 in monitor mode.

FIG. 6B shows the control chart 110 for weighting the condition code to index a control rule base. In step 112, the green light 17a (of FIG. 1) is turned on and the "stop" command is turned off. In step 114, _ma is tested for a non-zero value. If the instantaneous maximum or minimum values are violated, the green light 17a is immediately turned off, the red light 17c is turned on and a stop command is sent to the machine to cease operation immediately in step 116.

If _ma is zero in step 114, then _cr and _cc are tested for zero values. If both are zero, the CPU 16 returns to step 112 and the green light 17a remains on. If _cc and _cr are not both zero, the sum of the squares is compared to 9. If the sum of the squares of _cc and _cr does not exceed 9, the green light is turned off and the yellow light 17b is turned on in step 122. If the sum of the squares of _cc and _cr exceeds 9, which can only occur if one of the values is three and the other is non-zero, the green light 17a is turned off and the red light 17c is turned on in step 124. The CPU 16 returns to step 114 after step 122 or step 124.

The diagnosis rule base 130 is shown in FIG. 7–23. As described above, the diagnosis rule base is indexed according to the possible values of the monitored characteristics _cr, _cc and _ma. As can be seen in FIG. 7, if _cr, _cc and _ma are all 0, Rule 1 is indexed, indicating that the tool is in a normal condition. If _cr equals 0, _cc equals 0, and _ma equals 1, Rule 2 of rule base 130 is indexed, thereby indicating that either the tool or the workpiece is loose and that the process should be stopped. The remaining Rules 3–64 are indexed in a similar manner according the weighting technique described above.

The tool condition monitoring system 10 of the present invention thus not only provides a warning of a worn or broken tool, but also diagnoses the present condition of the operation process based upon a plurality of characteristics of the power consumption signal.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method for monitoring the condition of an electric motor powered tool including the steps of:
   a. monitoring the power consumption of the electric motor powered tool during performance of a cyclical task;
   b. counting the number of crossings by said power consumption of a power threshold;
   c. comparing the number of crossings to a predetermined number;
   d. comparing said power consumption to a predetermined maximum value;
   e. monitoring an amount of time that said power consumption is above and below said power threshold;
   f. comparing said amount of time to a predetermined time value;
   g. creating a rule base encompassing a plurality of combinations of possible outcomes of the comparisons of steps c), d) and f);
   h. associating each of said plurality of combinations with an associated potential condition of said electric motor powered tool;
   i. diagnosing said condition of said electric motor powered tool by indexing said rule base based upon said steps c), d) and f);

j. indicating said condition of said electric motor powered tool.

2. A system for monitoring the condition of an electric tool comprising:

means for measuring the power consumption of said electric tool during performance of a cyclical task;

means for monitoring a plurality of characteristics of said power consumption during said cyclical task; and means for diagnosing the condition of said electric tool based upon the combination of states of said plurality of characteristics, including a rule base encompassing a plurality of combinations of said plurality of characteristics, said rule base associating each of said plurality of combinations with an associated condition of said electric tool, and wherein said means for diagnosing the condition of said electric-powered tool indexing said rule base based on said monitored plurality of characteristics.

3. The system of claim 2 further including:

means for assigning a value for each of said plurality of characteristics;

said means for diagnosing diagnosing said condition based upon said values.

4. The system of claim 2 further including:

said means for diagnosing comparing said power consumption to a power threshold having an upper limit and a lower limit;

said means for diagnosing determining whether each of said plurality of characteristics occurs above an upper limit;

said means for diagnosing determining whether each of said plurality of characteristics occurs below a lower limit;

said means for diagnosing diagnosing based upon whether each of said plurality of characteristics occurred above the upper limit, below the lower limit or both.

5. A method of monitoring the condition of an electric-powered tool, comprising:

a) operating the electric-powered tool in a learning mode during performance of a cyclic task while monitoring a power consumption signal of the electric-powered tool having a plurality of distinct operational characteristics associated with the power consumption signal;

b) processing the power consumption signal and generating a diagnostic rule base comprising a plurality of different combinations of the operational characteristics each associated with a different operational condition of the electric-powered tool;

c) continuing to operate the electric-powered tool in a monitoring mode while performing the cyclic task and monitoring the power consumption signal of the electric-powered tool;

d) comparing the plurality of distinct operational characteristics associated with the power consumption signal from step c) with the diagnostic rule base; and e) diagnosing the existence of any of a number of particular operational conditions of the electric-powered tool by identifying a match between at least one combination of the plurality of combinations of operational characteristics associated with the power consumption signal monitored in step c) with a corresponding combination of operational characteristics of the diagnostic rule base.

6. The method of claim 5 wherein each of the characteristics is either absent or present, said method further including the step of diagnosing the condition of the electric-powered tool based upon the absence or presence of each of the plurality of operational characteristics.

7. The method of claim 6 further including the step of diagnosing the condition of the electric-powered tool based upon the presence of at least two of the plurality of characteristics.

8. The method of claim 5 wherein said plurality of different combinations of the operational characteristics includes all possible permutations of the plurality of operational characteristics, said method further including the step of indexing the diagnostic rule base based upon the permutations of the plurality of operational characteristics.

9. The method of claim 8 wherein said plurality of operational characteristics includes a first characteristic and a second characteristic, said first characteristic including a first upper threshold and a first lower threshold, said second characteristic including a second upper threshold and a second lower threshold.

10. The method of claim 5 wherein each of said plurality of operational characteristics includes four possible values, said method further including the step of indexing the diagnostic rule base based upon the four possible values.

11. the method of claim 10 further including the step of multiplying each of the four possible values of each of the characteristics by a different multiple of a base number to produce an index number, said method further including the step of indexing the diagnostic rule base based upon the index number.

12. The method of claim 5 wherein step b) includes assigning a value for each of said plurality of operational characteristics.

13. The method of claim 5 wherein step b) includes assigning an upper and lower limit of a power threshold of the electric-powered tool, and wherein steps d) and e) includes determining whether each of said plurality of operational characteristics of the power consumption signal occurs above the upper limit, below the upper limit, or both above and below the upper and lower limits, respectively.

14. The method of claim 13 wherein steps d) and e) further include counting the number of crossings of the power threshold limits by the power consumption signal and comparing the counted number of crossings to a predetermined number in diagnosing the operational condition of the electric-powered tool.

15. The method of claim 14 wherein step b) includes assigning a predetermined maximum value of the power consumption signal, and steps d) and e) includes comparing the monitored power consumption signal to the predetermined maximum value.

16. The method of claim 15 wherein step b) includes assigning a predetermined time value that power consumption operates above and below the power threshold limits, and in steps c) and d) monitoring an amount of time that the monitored power consumption signal spends above and below the power threshold limits and comparing the monitored time value to the predetermined time value.

17. The method of claim 5 wherein step a) includes operating the electric powered tool in the learning mode for a plurality of cyclic cycles.

\* \* \* \* \*

UNITED STATES PATENT AND TRADEMARK OFFICE
CERTIFICATE OF CORRECTION

PATENT NO. : 6,308,138 B1
DATED : October 23, 2001
INVENTOR(S) : Joel W. Jones et al.

It is certified that error appears in the above-identified patent and that said Letters Patent is hereby corrected as shown below:

Title page,
Item [56], References Cited, insert the following U.S. Patents
--  4,207,567    06/1980    Juengel et al.
    5,243,533    09/1993    Takagi et al. --

Column 1,
Line 9, change "modem" to -- modern --.

Column 7,
Line 45, before "__cr*4$^2$" cancel "ti".

Signed and Sealed this

Sixth Day of August, 2002

Attest:

Attesting Officer

JAMES E. ROGAN
Director of the United States Patent and Trademark Office